United States Patent [19]
Wittel

[11] 4,234,640
[45] Nov. 18, 1980

[54] CUSHIONED PRINTING LAMINATE

[76] Inventor: Frederick H. Wittel, P.O. Box 2501, Gainesville, Ga. 30501

[21] Appl. No.: 924,186

[22] Filed: Jul. 13, 1978

Related U.S. Application Data

[60] Continuation of Ser. No. 664,954, Mar. 8, 1976, abandoned, which is a division of Ser. No. 343,461, Mar. 21, 1973, abandoned.

[51] Int. Cl.³ .............................. B41N 1/00; B32B 3/30
[52] U.S. Cl. .................................... 428/159; 101/395; 428/165; 428/213; 428/215; 428/311; 428/320; 428/322; 428/333; 428/909
[58] Field of Search ............... 428/909, 158, 159, 160, 428/165, 161, 320, 311, 315, 322, 337, 213; 101/368, 395, 376, 401.3, 379

[56] References Cited
U.S. PATENT DOCUMENTS

| | | | |
|---|---|---|---|
| 2,133,981 | 10/1938 | Frazier | 101/379 |
| 3,819,471 | 6/1974 | Sohnemann | 428/909 |
| 3,903,794 | 9/1975 | Grupe | 428/909 |

Primary Examiner—Stanley S. Silverman

[57] ABSTRACT

A cushioned printing plate laminate comprising a face layer of plain gum compound on the front of which are formed raised printing elements, and a cushioned layer of foamed gum compound on the back of the face layer. The laminate may include a face layer and a cushion layer simultaneously cured along with the cushion layer being foamed as an incident to the curing.

12 Claims, 7 Drawing Figures

AFTER CURE

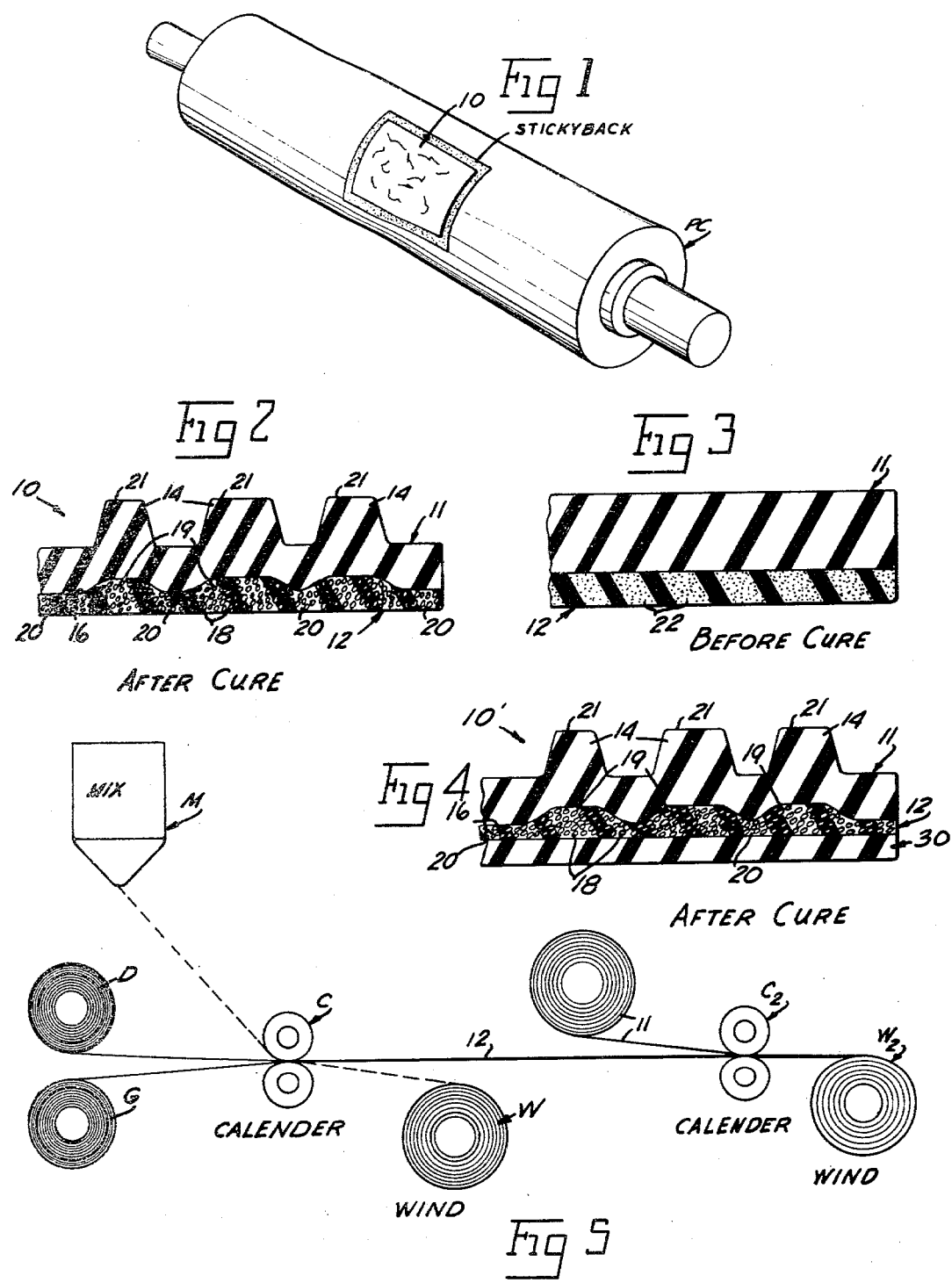

CUSHIONED PRINTING LAMINATE

CROSS-REFERENCE TO RELATED APPLICATIONS

This application is a continuation of my co-pending application Ser. No. 664,954, filed Mar. 8, 1976, now abandoned which is a division of my earlier application Ser. No. 343,461, filed Mar. 21, 1973, now abandoned.

BACKGROUND OF THE INVENTION

As the quality of printing equipment has progressed, closer tolerances were required in flexible printing plates used in connection with this equipment. Also as the speed of the printing equipment has increased, there has been a tendency of the plate cylinder carrying thwe printing plates to undesirably bounce as the leading edge of the printing plate engaged the impression or backup cylinder through the medium to be printed.

Because the close tolerances required by the printing equipment has been difficult to maintain in the printing plate molding and mounting operations, various attempts have been made to provide a printing plate which was able to provide compensation for a wider dimensional tolerance in the printing plate while maintaining good print quality and absorbing the high speed bounce affect. One such attempt has been to replace the standard double faced adhesive backing commonly known as "stickyback" with a sponge rubber cushion that had opposite sides coated with a pressure sensitive adhesive. While such attempt did produce the desirable tolerance compensation at the state of operation, several problems were encountered that has prevented the widespread use thereof.

One of these problems is that the cushioned material use did not have a resiliency such that the material fully recovered or rebounded between impressions on a printing machine thereby causing a compression set during operation to reduce the effectiveness of the cushion. Another problem is that it is difficult to obtain an adhesive which prevents lifting of the printing plate during operation. Yet another problem is that, because the strength of the cushion material is relatively weak, it is virtually impossible to remove it from the plate cylinder without destroying it once a printing run is completed. Even if the cushion material was destroyed upon removal, such removal is prohibitively time consuming and requires the use of strong solvents which may attack adjacent printing plates on the same printing cylinder. Another problem is that the solvents required for use in solvent base inks caused rapid deterioration of the cushion beyond usefulness.

SUMMARY OF THE INVENTION

These and other problems and disadvantages of the prior art are overcome by the invention disclosed herein by providing a cushioned printing laminate which not only has a capability of good quality printing over a wide tolerance range and a shock absorbing capability, but also does not take a compression set during printing. Moreover, separation of the cushion from the printing plate is virtually eliminated, mounting and demounting of the laminate is facilitated, and virtually the same solvent resistivity as conventional printing plates is maintained. Moreover, the cushioned laminate is mounted and handled in the same manner as a conventional printing plate so that no special equipment or techniques are required. Also, the same grinding techniques used with conventional printing plates can be applied to the laminate to adjust its thickness.

The laminate comprises a first layer of plain gum compound on which the printing elements are formed and a second layer of gum compound which has a foaming agent dispersed therein. The foaming agent foams the second layer during the simultaneous curing of both layers of the gum compound in a printing plate molding press. The curing of the layers also vulcanizes them together so that the resulting laminate performs a single unit. A third layer of plain gum compound may be placed behind the second layer to act as a backing for the laminate and cured with the other layers.

The first layer is formed in conventional manner while the second layer has the foaming agent, such as one of the Azo compounds, N-Nitroso compounds, Sulfonyl Hydrazides or the inorganic carbonates, dispersed therein by mixing and then calendering the mixture or solely by calendering. The layers may be calendered onto each other or may be laid up separately in a molding press. Heat and pressure are then applied in a molding press to first foam the second layer and then cure the layers to form the printing plate laminate.

These and other features and advantages of the invention will become more clearly understood upon consideration of the following detailed description and accompanying drawings wherein like characters or reference designate corresponding parts throughout the several views and in which:

BRIEF DESCRIPTION OF THE DRAWINGS

FIG. 1 is a perspective view showing the invention mounted on a plate cylinder;

FIG. 2 is a partial cross-sectional view taken through one embodiment of the invention after it is cured;

FIG. 3 is a partial cross-sectional view taken through that embodiment of the invention shown in FIG. 2 prior to curing;

FIG. 4 is a partial cross-sectional view taken through an alternate embodiment of the invention after it is cured;

FIG. 5 is a schematic diagram illustrating the forming of the invention;

Figure 6:
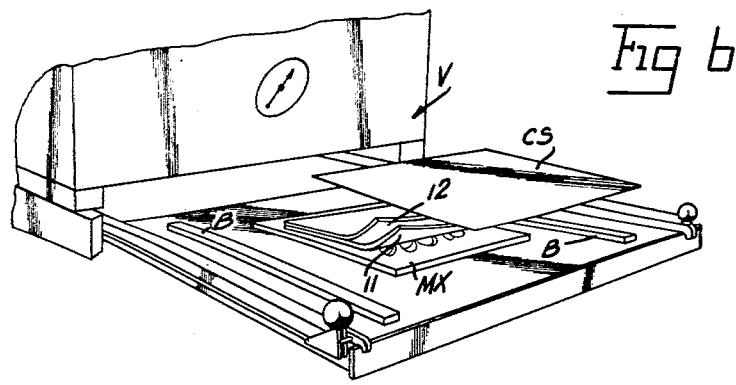
FIG. 6 is a perspective view of a printing plate molding press illustrating the formation of the laminate of the invention; and, FIG. 7 is a chart illustrating the curing cycle of the invention.

These figures and the following detailed description illustrate specific embodiments of the invention, however, it is to be understood that the inventive concept is not limited thereto since it may be embodied in other forms.

DETAILED DESCRIPTION OF ILLUSTRATIVE EMBODIMENTS

Referring to the figures, the cured printing plate laminate 10 includes generally a face layer 11 backed by a cushion layer 12. The laminate 10 is mounted on a plate cylinder PC in a conventional printing machine using known techniques such as stickyback or bonded onto a magnetic backing.

The face layer 11 is made using conventional gum compounds presently used to make conventional printing plates. While a wide variety of gum compounds are available, some of the more common compounds are natural rubbers, nitrile, vinyl and other synthetics. All of these gum compounds are curable within the temperature and pressure range available in a conventional molding press or vulcanizer presently used to mold and cure conventional printing plates. The raised printing elements 14 are provided on the outwardly facing side 15 of the layer 11 while the cushion layer 12 is molded onto the back 16 of layer 11.

The cushion layer 12 has been foamed with a foaming or blowing agent during the curing of the laminate 10. The layer 12 is made using a conventional gum compound like layer 11 except that the layer 12 has the foaming agent uniformly dispersed throughout prior to the laminate molding and curing operation. The agent gasifies or blows during the curing process to cause closed cell voids indicated by the numeral 18 in FIG. 2 throughout the cushion layer 12. It will also be noted that the layer 12 has a thicker section 19 under each of the raised printing elements 14 and a thinner section 20 under the non-printing or dead area of the face layer 11, the formation of which will be more fully explained. The voids 18 constitute about ½–¾ the volume of the layer 12.

Because only the printing face 21 of each of the raised printing elements 14 contacts the ink applicator roll of the printing machine and the substrate being printed as it is backed by the impression cylinder, only that area under the raised elements 14 need be substantially cushioned. Also, by reducing the thickness of the foamed layer 12 in the non-printing or dead areas, the lateral stability of the elements 14 and the printing face 21 of each is insured. Thus, uniform contact between the printing faces 21 and the ink applicator roll is insured so that the desirable uniform inking of the faces 21 is maintained as well as between the faces 21 and substrate being printed when it is backed by the impression cylinder so that the substrate is uniformly printed. While various thicknesses may be used for the sections 19, good results have been obtained where the sections 20 were 0.015–0.050 inch in thickness. The sections 20 should be as thin as practical, however, good results have been obtained where the sections 20 were one-half to two-thirds the thickness of the sections 19.

The laminate 10 prior to curing is illustrated in FIG. 3. The layer 12 has discrete particles of the foaming agent indicated by the numeral 22 uniformly distributed throughout. The layers 11 and 12 are positioned coextensively with each other and may be calendered together or remain separate until curing. The layer 12 may be colored differently than the layer 11 to facilitate identification of the layers, especially if the layers are calendered together prior to lay up into a charge for curing.

Figure 7:
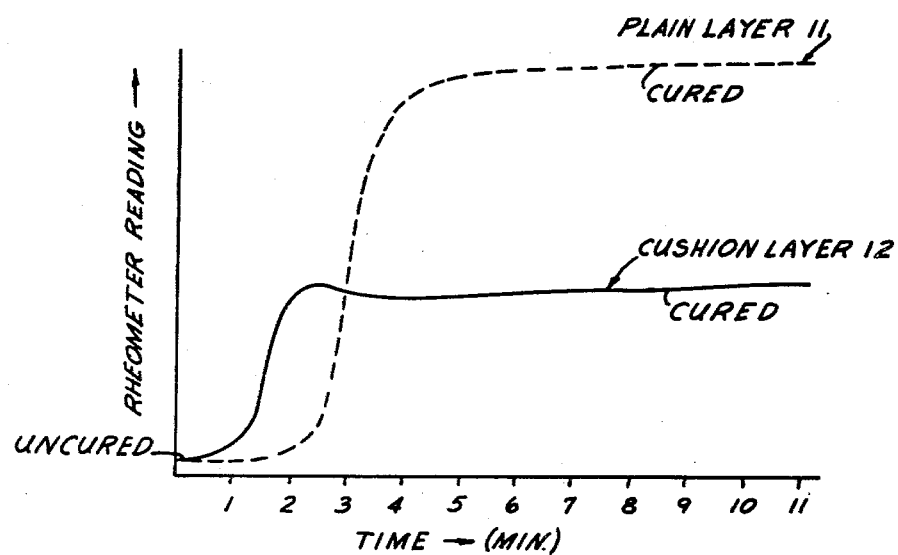

While various foaming agents 22 may be used, it must be capable of gasifying or blowing within the curing temperature range of the gum compound of the layers 11 and 12 and should be substantially gasified before substantial curing of the gum compound takes place. The foaming or blowing agent 22 is a thermally unstable chemical compound which decomposes upon heating to curing temperatures of the gum compound to release a gas and leave an inert residue. The gas release is timed, by selecting the proper chemical or adding activators to coincide with the initial rise in modulus of the gum compound thus trapping the gas bubbles in the vulcanized gum compound and allowing maximum expansion. A rheometer chart illustrating the relative curing times is shown in FIG. 7 with the face layer graph shown in a dashed line and the cushion layer graph shown by a solid line.

Some types of foaming or blowing agents 22 which could be used are as follows:

| | Decomposition Temp Range | Gas Yield ml./gram/@STP |
|---|---|---|
| Azo Compounds: | | |
| Azodicarbonamide (1,1' Azobisformamide) | 300° F.–400° F. | 220 |
| Azobis (isobutyronitrile) | 194° F.–239° F. | 130 |
| Diazoaminobenzene | 200° F.–210° F. | 115 |
| N-Nitroso Compounds: | | |
| N,N' dimethyl N,N' dinitroterephalamide | 180°–220° F. | 125 |
| N,N' dinitrosopentamethyl-enetetramine | 266°–374° F. | 265 |
| Sulfonyl Hydrazides: | | |
| Benzene Sulfonyl hydrazide | 210° F.–220° F. | 130 |
| P-Toluene Sulfonyl Hydrazide | 210°–230° F. | 111 |
| Diphenylsulfon 3,3' disulfonyl hydrazide | 266°–302° F. | 110 |
| p,p'-Oxybis (benzenesulfonyl) hydrazide | 260°–302° F. | 125 |
| Inorganic Carbonates | | |
| Sodium Bicarbonate | 210°–240° | |

In general the organic compounds give closed cell foam layer 12 while the inorganic carbonates give open cell foam layer 12 (connected cells). While the percentage of agent 22 to gum compound may vary depending on the gas yield of the foaming agent, it has been found that a layer 12 comprising approximately 3–6% by volume of the agent whose gas yield is in the neighborhood of 100–150 milliliters/grams is satisfactory.

While it is not necessary that the gum compounds of layers 11 and 12 be the same as long as both cure within the same temperature and time range, it is preferable that the gum compounds are the same to insure complete curing of both layers simultaneously, to insure that adequate bonding of the layers to each other takes place, and to insure that the resistivity of both layers to attack by solvents is the same. Because the layer 12 is made of a gum compound, the recovery or rebound of the layer 12 after it is compressed by the impression cylinder during the contact with the substrate of the elements 14 for printing is substantially instantaneous so that no compression set is encountered.

Referring now to FIG. 4, a second embodiment of the laminate is illustrated and designated 10'. Because some of the components of the laminate 10' are identical to the laminate 10, those components are identified by the same numerals applied to laminate 10. The laminate 10' further includes a backing layer 30 which is bonded to that side of the cushion layer 12 as an incident to the curing of the laminate. The layer 30 serves to locate the layer 12 sufficiently near the printing elements 14 to insure good cushioning of the elements and also to insure good strength on the back side of the laminate 10' so that it can be demounted from the plate cylinder without damage. While various materials may be used for the backing layer 30, a gum rubber compound is illustrated which has produced satisfactory results. It is also understood that the backing could be a metal or magnetic backing. The gum compound illustrated is the same as that used for the face layer 11 to insure good bonding between the layer 30 and layer 12 while layers 11, 12 and 30 are cured in a molding press. Preferably, the face layer 11 should be as thin as possible while still insuring sufficient flow during molding and curing to insure proper formation of the printing elements 14.

Because of the inherent resistance to movement between the raised printing elements 14 and the dead area of the unfoamed layer 11, it has been found that the amount of cushioning as well as the rate of recovery at the printing face 21 of elements 14 is somewhat dependent on the thickness of the layer 11. Satisfactory results have been obtained where the cushion layer 12 is located within 0.010-0.050 inch of the printing face 21 of elements 14.

It has also been found that the cushion layer 12 may be cured and foamed separately prior to the curing of the face layer 11 and backing layer 30. The cured cushion layer 12 is then placed between the uncured face layer 11 and backing layer 30 to form the charge and the charge cured in conventional manner to form the laminate 10 or 10'. The resulting laminate has substantially the same cross-sectional configuration as that shown in FIGS. 2 and 4 where the cushion layer 12 has thicker sections 19 under the printing elements 14 in face layer 11 and thinner sections 20 under the non-printing area of the face layer 11. The operation of this laminate is substantially the same as that of laminates 10 and 10'.

METHOD OF MANUFACTURE

Referring now to FIG. 5, the formation of the uncured layers 12 is illustrated. The foaming agent may be dispersed in layer 12 by first mixing the agent in powdered form with the gum compound in a conventional mixer M and then calendering in a calendering mill C to final size as shown by dashed lines in FIG. 5, or by obtaining the agent already dispersed in a high concentration in a gum compound indicated as D in FIG. 5 and then calendered with additional plain gum compound indicated at G in FIG. 5 in the mill C as shown by solid lines to obtain the proper dispersion. After proper dispersion of the foaming agent in the layer 12, it may be rewound into a roll at a winding station W as shown in dashed lines in FIG. 5, or the uncured layer 11 may be calendered thereon without any dispersion between the layers in a mill $C_2$ and the composite of the layers 11 and 12 wound in a winding station $W_2$ as shown by solid lines in FIG. 5. It is to be further understood that the uncured backing layer 30 may also be calendered onto the composite. The roll of layer 12 from winding station W or the roll of composite of the layers 11 and 12 from winding station $W_2$ is then usually shipped to a plate maker who molds and cures the layers into the printing plate laminate 10 or 10'.

The plate maker uses a conventional printing plate press or vulcanizer V such as that shown in FIG. 6 to form the laminate 10 or 10'. The preparation of the charge for the press is similar to that in current use. If the layers 11 and 12 are received separately, the uncured face layer 11 is first cut to a size just sufficient to cover the impression of the type matrix MX and is laid onto the matrix. Next, the uncured cushion layer 12 is cut to a size just sufficient to cover the already laid up layer 11. The plate maker then determines if any additional gum compound is needed to achieve the proper height for the charge and lays it over the layer 12 if required. If the layers 11 and 12 are received already calendered together, the plate maker simply cuts the composite to a size just sufficient to cover the matrix MX and lays the composite onto the matrix so that the face layer 11 overlies the impression on the matrix. Any additional gum compound needed to complete the charge is then added to the back side of the layer 12 as explained above.

Bearers or side irons B are then selected that correspond to that of the desired total thickness of the laminate 10 and positioned conventionally as shown in FIG. 6. A paper or metal cover sheets CS is placed over the entire charge and bearers B to prevent the formed laminate 10 from sticking to the top platen of press V during the curing operation.

The charge is then moved into the press V which has been preheated in conventional manner and heat and pressure applied to the charge in accordance with the prescribed time and temperature range for the gum compound of the layers. Usually the range is approximately 300° F.-312° F. for 8-12 minutes. Usually the curing of the gum compound starts after about 3 minutes in the press and is complete after about 8 minutes. The foaming agent usually starts to gasify or blow after about 1 minute in the press and has fully gasified after about 3 minutes in the press. The fact that the foaming agent gasifies before substantial starting of the curing operation serves to insure sufficient flow within the gum compound of the layer 12 to prevent destroying of the layer while at the same time forcing the face layer 11 partly into the impression on the matrix MX so that the thicker sections 19 are formed in the layer 12 under the finally formed elements 14 while the thinner sections 20 are formed where the matrix is supporting the layer 11 at the areas which will become dead areas on the finished laminate 10.

The thickness of the layer 12 is generally controlled by the spacing between the platens of the press V and the thickness of the layer 11 as well as any backing layer applied behind the cushion layer 12 during layup. Generally, the charge is laid up the same as for a conventional printing plate molding operation except that the uncured cushion layer 12 is included in the charge. The excess portions of the initial uncured layer 12 are expelled as flashing during the molding operation.

While the thickness of the uncured face layer 11 may be varied, two factors must be considered for good molding and operation of the laminate. The first is that the layer 11 must be thick enough to insure sufficient flow of the gum compound during molding to properly form the printing elements 14 and the second is that it must be sufficiently thin at the printing elements to insure that the cushioning effect of the layer 12 will be transmitted to the printing surface of each of the elements. Satisfactory results have been obtained using an uncured thickness of 0.020-0.060 inch for the layer 11.

The thickness of the cushion layer 12 is determined by the amount of cushioning desired. If the thickness is too great, then the printing elements 14 will not be sufficiently stable to obtain good print quality. While this thickness may be varied, good results have been obtained using an uncured thickness of approximately 0.025 inch which produces a cured thickness of the sections 19 of about 0.015-0.050 inch. It will be noted that the uncured layer 12 must have exposed edges so that the excess material produced by the foaming operation can escape and be trimmed from the finished laminate with the flash.

When the backing layer 30 is applied, it is used to complete the total thickness required for the laminate 10. The layer 30 is laid up in the charge and cured simultaneously with layers 11 and 12. Usually the uncured thickness of layer 12 is about 0.030-0.060 inch when finished laminate 10 is to have a nominal thickness of 0.125 inch. These thicknesses would be appropriately vaired if the finished laminate is to have a nominal thickness of 0.090 inch or 0.250 inch as is sometimes required.

It will be noted that the curing operation remains the same as with conventional printing plates so that no additional training of personnel is required. Moreover, the cushion layer 12 is handled just like another piece of conventional gum compound during lay up for the molding operation. Also, the finished laminate 10 or 10' can be mounted and proofed just as a conventional printing plate.

Alternatively, the uncured cushion layer 12 may be individually cured so as to cause the layer 12 to be foamed to a prescribed thickness. This may be preformed in a conventional molding press or vulcanizer by appropriately adjusting the thickness of the bearers or side irons. Because the curing and foaming of layer 12 is much faster than the normal curing time for plain gum compound the curing time may be appropriately reduced.

The final charge for the laminate is prepared similarly to that already disclosed. The uncured face layer is cut to size and laid over the matrix MX of the molding press V. Next, the cured cushion layer 12 is cut to size and laid onto the uncured face layer 11. Then, the appropriate thick backing layer 30 is cut to size and laid onto the cured cushion layer 12.

Bearers or side irons B are then selected that correspond to that of the desired total thickness of the laminate and positioned conventionally as shown in FIG. 6. A paper or metal cover sheet CS is placed over the entire charge and bearers B to prevent the formed laminate from sticking to the top platen of press V during the curing operation.

The charge is then moved into the press V which has been preheated in conventional manner and heat and pressure applied to the charge in accordance with the prescribed time and temperature range for the gum compound of the layers. Usually the range is approximately 300° F.–312° F. for 8–12 minutes. Usually the curing of the gum compound starts after about 3 minutes in the press aand is complete after about 8 minutes. The flow within the gum compound of the layers 11 and 30 causes the thicker sections 19 to be formed in the layer 12 under the finally formed elements 14 while causing the thinner sections 20 to be formed where the matrix is supporting the layer 11 at the areas which will become dead areas on the finished laminate.

EXAMPLE I

Several laminates made which were to have a final nominal total thickness of 0.125 inch. The cushion layer 12 was made by calendaring p, p'-oxybis (benzenesulfonyl) hydrazides as discrete particles of foaming agent into an uncured natural rubber base gum compound layer until the particles were thoroughly distributed throughout the layer and comprised approximately 3% by volume of the layer. Such a foaming agent is available from Uniroyal under its trademane "Celogen OT". The calendared thickness of the layer was nominally 0.025 inch.

Next a charge for each laminate was made for a conventional molding press by laying a layer of plain, uncured, natural rubber base face gum compound with a nominal thickness of 0.040 inch over the matrix followed by a layer of the uncured gum compound with the foaming agent over the plain layer. A backing layer of plain, uncured, natural rubber base gum compound with a nominal thickness of 0.060 inch was then laid over the foaming agent gum compound to complete the charge with a nominal total thickness of 0.125 inch.

Each charge was moved into the molding press and the charge cured under the normal heat, pressure and time range for the gum compound. This was 180 tons pressure, a temperature of approximately 307° F., and a time of approximately 10 minutes for the particular gum compound. After curing, the laminate was removed and mounted on a conventional mounter-proof machine. Because tone and process printing is the most difficult to accomplish, the particular laminates made were of this type for a six color printing job involving 54 laminates total.

Representative impression checks were made and it was found that a satisfactory impression was achieved just after the initial point of contact between the printing face of the printing elements with the impression cylinder was reached. The spacing between the plate cylinder and impression cylinder was reduced until the interference was approximately 0.011 inch without undesirable dot growth (the test used by the printing industry for determining the point at which the pressure destroys the impression). Dot growth has usually been encountered with conventional printing plates for tone and process work when the interference exceeded approximately 0.0003 inch.

The finished laminates were removed from the mounter-proofer machine and installed on commercially available flexographic printing presses using the conventional double faced adhesive, commonly known as "stickyback", to attach the laminate to the pirnting cylinder. The laminates together were sufficient to run one multicolor printing job with half-tones.

The first advantage over the prior art that was noticed was that the total time required for to set impression pressures and registration of all of the laminates was 25–30 minutes as compared with 3–7 hours with the prior art. This results from the ability of the laminate to compensate for slight misalignment between the surface of the printing cylinder and the impression cylinder as well as between the printing cylinder and ink transfer roll (anilox roll) so that uniform inking of the laminate and good print impression is assured over a much wider tolerance range than that associated with the prior art. Also, the produced laminates did not have to be ground as is generally the case with the prior art because of the ability of compensate for the wider tolerance range.

Another advantage over the prior art was noticed during the actual printing run. This occurred when the double thickness of a flying splice on the substrate being printed passed through the printing press. The registration and impression settings between the different stations did not alter as the splice passed therethrough whereas in the prior art such registration and the impression settings were altered. The added resiliency of the laminates prevented this alteration. Also, a break in the substrate during a press run altered the registration only slightly thereby allowing rapid re-registration after repair of the break. The impression settings were not altered. Such a break when using prior art printing plates has frequently caused registration and impression setting to be so far out that considerable time was required to re-register and reset impressions on the press.

EXAMPLE II

A set of laminates was made which were to have a final nominal total thickness of 0.125 inch. The cushion layer 12 was made by calendaring p,p'-oxybis (benezenesulfonyl) hydrazide as discrete particles of foaming agent into an uncured, natural rubber base gum compound layer until the particles were uniformly distributed throughout the layer and comprised approximately 3% by volume of the layer. The calendared thickness of the layer was nominally 0.025 inch. Next, the layer was placed between two flat matrices in a conventional molding press and the barriers or side irons adjusted to form a layer about 0.035 inch thick. The press was closed onto the layer after preheat until a pressure of about 250 p.s.i. was reached and the layer heated at about 307° F. for 8 minutes. This caused the layer to be foamed by the blowing of the foaming agent and cured. The foamed layer was then removed and measured. The cured cushion layer had a nominal thickness of 0.036 inch. The cured cusion layer also had a thin surface skin thereon so that none of the voids opened onto the faces of the layer. The layer was found to be compressible to about 0.3 of its normal thickness and recovered upon release to its normal thickness.

Next, the final charge for each laminate was made by laying a layer of plain, uncured, natural rubber base face gum compound with a nominal thickness of about 0.040 inch over the type matrix followed by the cured cushion over the face gum compound. A backing layer of plain, uncured, natural rubber base gum compound with a nominal thickness of about 0.060 inch was then laid over the cured cushion layer to complete the charge. Each charge was moved into the molding press and the charge cured under the normal heat, pressure and time range for the gum compounds. This was about 180 tons pressure, a temperature of approximately 307° F., and a time of approximately 10 minutes. When the finished laminate was removed, it was noted that the cushion layer was firmly vulcanized to both the face layer and backing layer, and thicker sections were present in the cushion layer under the printing elements while thinner sections were present under the non-printing area of the face layer.

It is further to be understood that full use of modifications, substitutions, and equivalents may be made without departing from the scope of the invention as disclosed herein.

I claim:

1. A printing laminate comprising:
    a vulcanized rubber compound printing layer having a front side and a back side, and including raised printing elements formed on the front side thereof and lowered nonprinting areas formed on the front side thereof between said raised printing elements, each of said printing elements defining a printing face thereof; and
    a cushion coextensive with and vulcanized to the back side of said printing layer including a foamed cushion layer of vulcanized rubber compound having voids uniformly distributed throughout, said voids constituting at least about one-half of the volume of said foamed cushion layer, said cushion layer including first portions underlying said raised printing elements of said printing layer having a first prescribed thickness to effectively cushion said printing elements during printing and second portions underlying said non-printing areas of said printing layer having a second prescribed thickness less than said first prescribed thickness of said first portions under said raised printing elements of said printing layer, said second prescribed thickness being no greater than about two-thirds said first prescribed thickness to maintain the lateral stability of said printing elements on the printing laminate while said first portions of said cushion layer effectively cushion said printing elements, that side of said cushion opposite said printing generally parallel to said printing faces on said printing elements and said first portions extending up behind said printing elements beyond the plane of the back side of said lowered non-printing areas of said printing layer.

2. The printing laminate of claim 1 wherein said first prescribed thickness of said cushion under said printing elements is 0.015–0.050 inch and wherein said second prescribed thickness of said cushion under said non-printing areas is one-half to two-thirds said first prescribed thickness.

3. The printing laminate of claim 2 wherein cushion under said printing elements is within 0.010–0.050 inch of said printing faces on said printing elements.

4. The printing laminate of claim 2 wherein said layer of vulcanized rubber compound of said cushion has been cured with and vulcanized to said printing layer concurrently with the vulcanization of said printing layer.

5. The printing laminate of claim 4 wherein said foaming agent has been selected to foam within the vulcanizing temperature range of said layer of said cushion and before substantial vulcanization of said layer of said cushion.

6. The printing laminate of claim 5 wherein said foaming agent is a material having been selected from the group consisting of azo compounds, N-Nitroso compounds, sulfonyl hydrazides and inorganic carbonates.

7. The printing laminate of claim 6 wherein said foaming agent constitutes about 3–6 percent by volumes of said cushion prior to vulcanization of said cushion.

8. The printing laminate of claim 2 further including a vulcanized rubber compound backing layer coextensive with and vulcanized to that side of said cushion opposite said printing layer, that side of said backing layer opposite said cushion generally parallel to said printing faces on said printing elements.

9. The printing laminate of claim 8 wherein said cushion, said printing layer, and said backing layer have been concurrently vulcanized.

10. The printing laminate of claim 9 wherein the printing laminate has a nominal total thickness of 0.125 inch.

11. The printing laminate of claim 1 wherein the volume of said voids constitute approximately one-half to three-fourths the volume of said cushion; wherein said first prescribed thickness of said cushion under said printing elements is 0.015–0.050 inch and wherein said second prescribed thickness of said cushion under said non-printing areas is one-half to two-thirds said first prescribed thickness; and wherein said cushion under said printing elements is within 0.010–0.050 inch of said printing faces on said printing elements.

12. The printing laminate of claim 11 further including a vulcanized rubber compound backing layer coextensive with and vulcanized to that side of said cushion opposite said printing layer, that side of said backing layer opposite said cushion generally parallel to said printing faces on said printing elements and said backing layer having been vulcanized concurrently with said cushion and said printing layer.

* * * * *